United States Patent [19]
Milligan et al.

[11] 3,736,146
[45] May 29, 1973

[54] RUMINANT FEED OF UREA-FURFURAL REACTION PRODUCT

[75] Inventors: Larry P. Milligan; Alexander R. Robblee, both of Edmonton, Alberta, Canada; John C. Wood, Piedmont, Calif.; Sujit K. Chakrabartty, Edmonton, Alberta, Canada

[73] Assignee: Canadian Patents & Development Limited, Ottawa, Ontario, Canada

[22] Filed: May 7, 1970

[21] Appl. No.: 35,577

[52] U.S. Cl. .................99/2 ND, 260/347.3
[51] Int. Cl. .............................A23k 1/00
[58] Field of Search .................99/2 R, 2 N, 4, 2; 71/27, 28, 49, 54; 260/347.3

[56] References Cited
UNITED STATES PATENTS

| | | | |
|---|---|---|---|
| 2,934,435 | 4/1960 | May | 99/140 |
| 3,619,200 | 5/1967 | Ferguson | 99/2 G |
| 3,365,468 | 1/1968 | Feichtinger | 260/347.3 |
| 1,827,824 | 10/1931 | Novotny et al. | 260/68 |
| 3,490,912 | 1/1970 | Freese | 99/2 |
| 2,595,492 | 5/1952 | Simons | 260/347.3 |

*Primary Examiner*—Norman Yudkoff
*Assistant Examiner*—Hiram H. Bernstein
*Attorney*—Morris Fidelman and Fidelman, Wolffe and Leitner

[57] ABSTRACT

A reaction product of urea and furfural containing about 21 to 26 percent by wt. nitrogen has been prepared and found to be an efficient non-protein nitrogen source for animals particularly ruminants. A reaction product having about 3 moles of urea with two of furfural is preferred. The nitrogen is released slowly and gives enhanced nitrogen retention in the animal without toxicity.

9 Claims, No Drawings

RUMINANT FEED OF UREA-FURFURAL REACTION PRODUCT

This invention relates to a new means of facilitating the utilization of non-protein nitrogen by ruminants. A specific urea-aldehyde reaction product of improved properties, is provided.

Since protein supplementation of animal rations is expensive and directly competitive with the supply of protein for humans, there is justification for attempting to take full advantage of the ability of ruminants to convert dietary non-protein nitrogen to protein for human consumption. The most commonly used and most readily available non-protein nitrogen source for ruminants is urea; however, the high level of microbial urease in the rumen catalyses its very rapid hydrolysis to ammonia. The resultant ammonia is readily absorbed into the bloodstream of the host and, providing it does not cause ammonia toxicity, the major portion is converted back to urea in the liver. This is a waste product of the animal's metabolism and a sizeable proportion of it is excreted in the urine. Thus, as a result of its rapid hydrolysis in the rumen, the problems associated with feeding urea to ruminants are two-fold: 1. ammonia toxicity becomes a very real danger, 2. the proportion of the dietary urea nitrogen used for microbial protein synthesis may be undesirably low. It is, therefore, now generally recommended that not more than 25 percent of the nitrogen in the ration be provided by urea, and that even then adequate levels of readily available energy be supplied in order that the rapidly released nitrogen may be utilized.

Attempts have been made to reduce the rate of hydrolysis of urea by the rumen microflora through the use of urease inhibitor acetohydroxamic acid (Jones, Can. J. Microbiol. 14: 409–416, 1968). However, the concentration required for effectiveness was very high ($10^{-2}$M) and it had effects upon other ruminal metabolic activities which may prove detrimental.

Many non-protein nitrogen sources other than urea have been fed to ruminants. These include such compounds as ammonium salts, amides, and biuret. The majority of these nitrogen sources have suffered from various drawbacks including expense, toxicity, poor utilization, and undesirable physical properties.

Certain urea-aldehyde condensation products have been tried as non-protein nitrogen source for ruminants (see U.S. Pat. No. 2,687,354 Gribbins Aug. 24, 1954). However only a minor proportion of such prior condensation products has been found to be digestible i.e. only a fraction of the nitrogen is biologically utilized or available. Also the nitrogen which is available is released too quickly i.e. in less than about 24 hours. Behavior in feeding trials of such products has not been impressive compared to urea. We have tested urea-butyraldehyde condensation products with rumen contents in vitro and found that only the nitrogen of the unreacted urea is released, while that of the condensation product is quite inert.

It has also been suggested to add urea to rice hulls, oat hulls, corn cobs, or alfalfa but the mixing conditions did not lead to release of furfural and its reaction with urea.

Quite recently, urea and finely ground grains (as starch sources) have been mixed and passed through the cooker-extruder under conditions causing gelatinization of the starch (Bartley et al., "Feedstuffs" Apr. 27, 1968). The resultant product has been used as a non-protein nitrogen supplement for ruminants and is called Starea (trademark). Feeding trials have demonstrated that the nitrogen of Starea is released less rapidly than the nitrogen in urea. There appear to be some drawbacks associated with Starea, including the facts that the nitrogen content is relatively low (6.8 percent), it is made using grains and thus represents a competition with humans for food, and there is no evidence of the extent to which the nitrogen is available to the microbial population of the rumen.

An object of the present invention is to provide a non-protein nitrogen source which is readily fermented by microorganisms which inhabit the rumen, and which can be substantially completely utilized by ruminant animals.

A further object of the invention is to provide a non-protein nitrogen source for ruminants which has a high nitrogen content or protein equivalent, and which does not produce toxic effects when fed in large quantities to ruminant animals.

Yet another objective of the invention is to provide a urea-aldehyde condensation product which will act as a suitable non-protein nitrogen source, while at the same time acting as a source of energy for the animal by which it is consumed.

Still a further objective of this invention is to provide a means of preparing a non-protein nitrogen source which is a urea derivative in which the urea is combined with furfural.

The present invention involves the controlled reaction of urea with an aldehyde (furfural) to produce materials which are shown to be suitable nitrogen supplements to the diet of ruminant animals.

According to the invention urea is condensed with furfural under acidic conditions to give a granular solid of about 21 to 26 (preferably 24–26) percent by wt. nitrogen. The dried relatively insoluble non-hygroscopic (but slowly hydrolyzable in water) product may then be incorporated in animal feeds or rations as was done for urea in the past. A suitable supplement rate is about 1 to 4 percent by wt. based on feed solids, although any amount up to about 10 percent may be useful depending on many factors. The supplement may be masterbatched with the feed for subsequent dilution e.g. in amounts up to about 40 percent by wt.

The method of production of the reaction product of furfural and urea involves a number of parameters. For example, experiments have shown that:

1. The reaction will take place in alcohol, water, or other solvents or, if sufficient furfural is used, without any solvent at all. It was found, however, that a dilute solution of the reactants produced the best results. Water is the preferred reaction medium.

2. An acid pH favors the reaction, and while a pH of about 3.5 appears to be best, the reaction will proceed at virtually any acidic pH.

3. Various mole ratios of furfural to urea up to about 1/1 all appear to produce the same (or a similar) product. A preferred mole ratio is about 0.5/1. A low ratio was used in order to react most or all of the furfural: the recovery of unreacted furfural was found to be difficult and somewhat inconvenient. It is preferred to use a stoichiometric excess of urea to assure reaction of all the furfural, and to obtain a high nitrogen product. The unreacted urea is readily recycled. However the crude mixture of urea and reaction product can be fed directly.

4. The reaction product was found to darken rapidly upon standing, or even during the drying process: however, this darkening was found to be not detrimental and controllable if desired, by the addition of small amounts of antioxidants such as butylated hydroxyanisole or butylated hydroxytoluene.

5. The temperature at which the reaction proceeded did not appear to be critical: however, the amount of discoloration (darkening) could be materially reduced by keeping the temperature below 30° C. Such discoloration does not appear detrimental to the performance of the product as a feed supplement.

For a fuller understanding of this invention, reference should be had to the following illustrative examples.

EXAMPLE 1

Sixty-two and four-tenths pounds of feed-grade urea was dissolved and/ or suspended with stirring in 40 lb. of cold water. The temperature rapidly fell to 9° C but was allowed to rise spontaneously to 23° C. At this time, 3.5 lb. of glacial acetic acid was added, followed immediately by addition of 25 lb. of furfural and 98 g of butylated hydroxyanisole. (The mole ratio of furfural to urea in the mixture was about 0.3/1). The whole mass was vigorously stirred for 4.5 hr., during which time a further 80 lb. of water was added in small portions. At the end of this period, the reaction mixture was a very thick slurry and its temperature had risen to 31° C. The product was very granular precipitate which was easily filtered and washed with water. After drying, the product weighed 36 lb. and had a moisture content of 3.7 percent and a nitrogen content of 23.2 percent (by wt.).

EXAMPLE 2

The rate at which rumen organisms were able to produce ammonia from the product of Example 1 was evaluated in in vitro incubations. Incubations were conducted using 1/2-pint bottles fitted with a rubber stopper containing a gas inlet, a gas outlet with a one-way valve, and a tube fitted to a syringe to withdraw samples of contents. The procedure involved removal of rumen contents from a rumen-fistulated cow that was fed good quality alfalfa-bromegrass hay and expression of the liquid through four layers of cheesecloth. Sufficient rumen fluid was taken to fill a pre-warmed pint vacuum flask, which was then stoppered and returned to the laboratory. Fifty ml of rumen fluid were added to each pre-warmed incubation flask. The flasks contained 200 ml of $CO_2$-gassed salts medium with $(NH_4)_2SO_4$ omitted (El Shazly and Hungate, J. Appl. Microbiol. 13: 62–69, 1965), 2.5 g of finely ground grass hay (1.8% N), 0.1 ml 1 N NaOH, and when substrates were being investigated, either 46.7 mg of N as urea, or 46.7 mg N as the product of Example 1. Following addition of rumen contents, the flasks were stoppered, gassed rapidly with $CO_2$ for 1 min, and incubated in a $H_2O$ bath at 39° C with shaking (120 cycles per min). Periodically, during incubation, approximately 5 ml samples were removed from the flasks for ammonia analysis. The 5 ml sample was withdrawn with the syringe, strained through loosely packed glass wool, and 0.2 ml of filtrate was removed and diluted to 2.0 ml with $H_2O$. One ml of 18% (w/v) $Ba(OH)_2 \cdot 8H_2O$ and 1 ml of 2.0% $ZnSO_4 \cdot 7H_2O$ were added and the precipitate was centrifuged down at 1,000 × g for 5 min. One ml of the supernatant solution was used for ammonia analysis by the hypochlorite procedure of Fawcett and Scott, J. Clin. Path. 13: 156–159 (1960). The results of two such series of incubations are presented in Table I.

TABLE 1

In Vitro Production of Ammonia by Rumen Contents
(values expressed as $\mu$g ammonia N/ml flask contents)

| Incubation A Substrate: | Hay | Hay + Urea-furfural Product | Hay + Urea |
|---|---|---|---|
| No. of Flasks: | 2 | 3 | 1 |
| Time of incubation (hr) | | | |
| 0 | 34.9 | 36.6 | 36.8 |
| 1 | 49.7 | 63.8 | 116 |
| 2 | 49.7 | 68.1 | 214 |
| 18 | 78.2 | 164 | 236 |
| Incubation B Substrate: | Hay product | Hay + Urea-furfural | Hay + urea |
| No. of Flasks: | 2 | 1 | 1 |
| Time of incubation (hr) | | | |
| 0 | 82.4 | 93.7 | 84.5 |
| 1 | 102 | 111 | 143 |
| 2.5 | 91.5 | 119 | 198 |
| 17 | 110 | 198 | 299 |
| 24 | 137 | 213 | 299 |

It is to be noted from these results that the rumen population was capable of producing ammonia from the urea-furfural product, as evidenced by the ammonia levels at 17 hr or after. However, the differences in the total ammonia content of the flasks containing hay plus urea-furfural product and those containing only hay, after 17 hours of incubation, account for only about 46 percent of the nitrogen added as urea-furfural product. Of very great significance, also, is the fact, as shown by the data of Table I, that the rate of ammonia production from the urea-furfural product was markedly less than that from urea. In fact, from these results, it is estimated that the initial rate of ammonia production from urea was 74 $\mu$g (micrograms) N/ml of flask contents/hr and 42 $\mu$g N/ml of flask contents/hr in incubations A and B, while the rate of ammonia production from the urea-furfural was 10 $\mu$g N/ml flask contents/hr and 6.4 $\mu$g N/ml flask contents/hr in incubations A and B. Further, it is noted that after 2 hr in incubation A the total ammonia content of the urea flask in excess of that in the hay flasks accounted for 88 percent of the added urea N, and, after 2.5 hr in incubation B, 57 percent of the added urea N was accounted for as ammonia. The rapid initial accumulation of ammonia was not evident in the flasks containing the urea-furfural product and, as mentioned previously, after about 17 hr of fermentation some 46 percent of the supplemental nitrogen was converted to ammonia.

EXAMPLE 3

The urea-furfural product of Example 1 was further evaluated in a nitrogen balance study using lambs. The experiment was designed as a Latin Square in that there were three ram lambs used, three feeding periods involving two weeks of adaptation to the ration plus one week of collection, and three diets including the control, urea-supplemented, and urea-furfural product-supplemented. Upon completion of the experiment, each lamb had then received each ration for one feeding period. At the outset of the experiment the lambs weighed 75, 77, and 72 lb, and were given 250,000 IU vitamin A, 37,500 IU vitamin D, and 25 IU vitamin E by subcutaneous injection. Throughout the experiment, the lambs were kept in metal metabolism crates, with a mixture of 50 percent cobaltized, iodized salt and 50 percent bonemeal available in a mineral box. Water was available at all times. The lambs were fed 225 g of concentrate pellets and 400 g of cut (2 in) fescue-alfalfa hay (1.39% N) in separate boxes twice daily (8:00 a.m. and 8:00 p.m.). During the collection periods, urine was collected twice daily (8:00 a.m. and 8:00 p.m.) in a glass bottle containing 25 ml of 25% (v/v) $H_2SO_4$, the volume was recorded, and 10% by volume was kept and frozen for analysis. Feces were collected once daily (8:00 a.m.), the weight recorded, and 25 percent by weight was kept and frozen for analysis. The urine samples from each animal for each collection period were thawed, combined, and analyzed for N by standard Kjeldahl procedures. The fecal samples from each animal for each collection period were thawed, dried for 2 days at 95° C, combined, ground using a laboratory mill, and analyzed for nitrogen and moisture by standard procedures. The compositions of the concentrate pellets and hay are given in Table 2, and daily nitrogen intakes are presented in Table 3.

TABLE 2

Composition of Pellets

| Components Mixed | Control | Urea | Treatment: urea-furfuraldehyde Product |
|---|---|---|---|
| Rolled barley | 95 kg. | 92.4 kg | 89.25 kg |
| Beet molasses | 5 | 5.0 kg | 5 kg |
| Urea (feed grade) | 0 | 2.6 kg | 0 |
| Urea-furfuraldehyde product | 0 | 0 | 5.75 kg |
| By analysis | | | |
| Nitrogen (%) | 1.302 | 2.312 | 2.483 |
| Moisture (%) | 11.41 | 10.96 | 11.89 |

TABLE 3

Daily Nitrogen Intakes (g N/day)

| Feeding Period | Ration Components | Control | Urea | Treatment: Urea-furfural product |
|---|---|---|---|---|
| 1 | Hay | 8.818 | 8.516* | 9.839 |
| | Pellets | 5.859 | 10.404 | 11.174 |
| | TOTAL | 14.677 | 18.920* | 21.013 |
| 2 | Hay | 11.088 | 11.088 | 11.088 |
| | Pellets | 5.859 | 10.404 | 11.174 |
| | TOTAL | 16.947 | 21.492 | 22.262 |
| 3 | Hay | 11.088 | 11.088 | 11.088 |
| | Pellets | 5.859 | 10.404 | 11.174 |
| | TOTAL | 16.947 | 21.492 | 22.262 |

* This value is based on a 4.5 day collection period because at this point the lamb escaped from its metabolism crate.

The nitrogen intake of the lambs receiving the urea-furfural product was greater than that of the urea-supplemented animals (Table 3). This occured because the pellets containing the urea-furfural product had a slightly higher nitrogen content than those containing urea (Table 2) but were fed at the same level. Also, in period 1, the difference was accentuated because the lamb fed the urea-furfural product consumed 645 g of the daily 800 g hay allotment. During this feeding period, the two other animals were allotted only as much hay as the lamb given urea-furfural product ate in the previous feeding. These other lambs consumed all of their hay allotments. Analysis of the hay weigh-backs from the lamb fed urea-furfural product revealed that the portion of its hay that it did not consume contained less nitrogen (0.81% N) than the hay offered (1.39% N). Consequently, although all lambs in the first period consumed the same daily weight of hay, the lamb fed urea-furfural product consumed material of a greater nitrogen content (1.53% N) than that eaten by the others (1.39% N). The nitrogen balance results from this evaluation are presented in Table 4, while digestibilities and nitrogen excretions are presented in Tables 5 and 6.

TABLE 4

Daily Nitrogen Balances (g N retained/day)

| Feeding Period | Control | Urea | Treatment: Urea-furfural Product |
|---|---|---|---|
| 1 | 3.77 | 4.93* | 7.56 |
| 2 | 4.36 | 5.58 | 7.84 |
| 3 | 4.72 | 3.87 | 7.79 |
| Average: | 4.28 | 4.79 | 7.73 |

* This value is based on a 4.5 day collection period because at this point the lamb escaped from its metabolism crate.

TABLE 5

Apparent Dry Matter Digestibility (percent)

| Feeding Period | Barley | Urea | Treatment: Urea-furfural Product |
|---|---|---|---|
| 1 | 59.4 | 59.3 | 64.0 |
| 2 | 59.3 | 60.3 | 59.5 |
| 3 | 62.1 | 60.4 | 58.8 |
| Average: | 60.3 | 60.0 | 60.8 |

TABLE 6

Daily Nitrogen Excretion (g N/day)

| Feeding Period | Component | Control | Urea | Treatment: Urea-furfural Product |
|---|---|---|---|---|
| 1 | Urine | 2.960 | 6.646* | 6.370 |
| | Feces | 7.943 | 7.340* | 7.087 |
| | TOTAL | 10.903 | 13.986* | 13.457 |
| 2 | Urine | 4.488 | 7.715 | 6.896 |
| | Feces | 8.096 | 8.196 | 7.526 |
| | TOTAL | 12.584 | 15.911 | 14.422 |
| 3 | Urine | 5.254 | 10.338 | 6.335 |
| | Feces | 6.972 | 7.284 | 8.133 |
| | TOTAL | 12.226 | 17.622 | 14.468 |

* This value is based on a 4.5 day collection period, because at this point the lamb escaped from its metabolism crate.

From the data of Table 4 it is noted that the urea-furfural product enhanced nitrogen retention by 3.4 g per day while supplementation with a similar quantity of nitrogen as urea enhanced nitrogen retention by only 0.5 g/day. It is considered that this greatly superior effect of the urea-furfural product is primarily a result of production of ammonia from it at a rate slower than from urea and more amenable with the rate at which the microbial population was able to utilize the ammonia for protein synthesis. Since dry matter digestibilities of the rations did not differ (Table 5), the implication is that the microbial population of the rumen, when provided with supplemental nitrogen as the urea-furfural product, synthesized more protein per unit of digested feed than when not supplemented, or when supplemented with nitrogen as urea. It is also to be noted that, since dry matter digestibilities (Table 5) and fecal nitrogen excretions (Table 6) did not differ, the apparent digestibilities of the nitrogen supplements were 100 percent.

EXAMPLE 4

It was desired to obtain some information relative to the rate of formation of ammonia from the urea-furfural product in vivo after the rumen population had become adapted to it. A jugular catheter was established in each of the lambs of Example 3 following feeding period 3 (after each lamb had received its respective ration for 24 days). Five-ml blood samples were withdrawn into heparinized syringes from each lamb at various time intervals throughout the day. Plasma was prepared from each of the blood samples and the plasmas were assayed for urea using the urease-hypochlorite method of Fawcett and Scott mentioned above. The results of this study are presented in Table 7. The values presented in Table 8 are calculated directly from the data of Table 7.

TABLE 7

Plasma Urea Concentrations ($\mu$g urea N/ml) of Lambs at Various Times During the Day*

| Sample No. | Time of Sampling | Barley | Urea | Treatment: Urea-furfural Product |
|---|---|---|---|---|
| 1 | 9:15 am | 124 | 143 | 198 |
| 2 | 10:15 am | 147 | 177 | 220 |
| 3 | 12:00 noon | 124 | 213 | 205 |
| 4 | 2:15 pm | 99 | 191 | 160 |
| 5 | 4:10 pm | 96 | 172 | 148 |
| 6 | 6:00 pm | 95 | 166 | 155 |
| 7 | 7:10 pm | 102 | 189 | 160 |
| 8 | 8:00 pm | 93 | 207 | 167 |
| 9 | 9:00 pm | 83 | 206 | 160 |
| 10 | 10:00 pm | 75 | 204 | 152 |

* All animals were fed 400 g hay plus 225 g of their respective pellets at 9:30 am and at 6:10 pm.

TABLE 8

Difference of Plasma Urea Concentrations of Lambs Fed Urea, or Urea-Furfural Product, From Those of the Lamb Fed Barley Pellets (Values are $\mu$g urea N/ml)*

| Sample No. | Time of Sampling | Urea | Treatment Urea-furfural Product |
|---|---|---|---|
| 1 | 9:15 am | 19 | 74 |
| 2 | 10:15 am | 30 | 73 |
| 3 | 12:00 noon | 89 | 81 |
| 4 | 2:15 pm | 92 | 61 |
| 5 | 4:10 pm | 76 | 52 |
| 6 | 6:00 pm | 71 | 60 |
| 7 | 7:10 pm | 87 | 58 |
| 8 | 8:00 pm | 114 | 74 |
| 9 | 9:00 pm | 123 | 77 |
| 10 | 10:00 pm | 129 | 77 |

* All animals were fed 400 g hay plus 225 g of their respective pellets at 9:30 am and at 6:10 pm.

From Table 7 and, particularly, Table 8, it is seen that the plasma urea level was increased very markedly and rapidly when the diet containing urea was fed. This would reflect the rapid hydrolysis of urea in the rumen, absorption of the resultant ammonia, and conversion of this ammonia to blood urea. On the other hand, the blood urea level of the animal fed the urea-furfural product was constantly higher than, but remarkably parallel to, that of the animal fed the unsupplemented ration. The abrupt maxima, following feeding, observed in the animal fed urea were not evident in the lamb fed urea-furfural product. These results indicate that in the adapted lamb the in vivo production of ammonia from the urea-furfural product did indeed parallel the rate of rumen microbial metabolism, while the in vivo hydrolysis of urea was most marked 2 to 4 hr following feeding.

EXAMPLE 5

Ten yearling steers, mainly Hereford, were fed the urea-furfural product in a controlled feedlot study using a barley-based concentrate ration. Rate of gain and efficiency of feed conversion were improved over a similar urea-supplemented ration, and over a basal ration not supplemented with nonprotein nitrogen. Improved intake of polymer by the steers was observed when the reaction product was pelleted with grain rather than hand mixed loose into the ration. After consumption of the urea-furfural product for more than four months, the carcasses of the steers did not appear to accumulate any detectable odors or tastes, and urinary furfural excretion fell to control levels within 24 hours of withdrawal of the product from the ration.

EXAMPLE 6

Feed grade urea, 62.5 g, was mixed with 40 g of water, 4 g of glacial acetic acid and 40 g of freshly distilled furfural (mole ratio of furfural to urea about 0.4/1) and stirred at room temperature until the mixture thickened (about one-half hour). After a further three hours at room temperature, without further stirring, the mixture had become a white solid. (This crude solid product can be used as a feed supplement directly without further processing). This solid was then broken up and washed on a Buchner funnel with 300 ml of water and 150 ml of acetone. The solid residue after drying in the air weighed 60.0 g and had the following elemental composition:

C 43.6; H 4.7; N 24.4; Ash 2.1

The filtrate and washings from above were found to contain unreacted starting materials, namely 32 g of urea and 3.3 g of furfural. The ash came from the filler in the feed grade urea. This a good material balance when cognizance is taken of the fact that one mole of water is very probably eliminated during the condensation of each mole of furfural. The following observations were made on the reaction product.

1. Dilute acid (0.1N HCl) at room temperature completely hydrolyzed the material in about 2 hours. The products were urea and furfural in the mole ratio of 3:2.

2. The elemental analysis was consistant with this ratio. If we assume the combination of the reactants by condensation with the elimination of a mole of water for each mole of furfural reacted, then the molecular formula would be:

$$C_{13}H_{16}N_6O_5$$

In Table 9, we have shown how this compares with the experimental values.

TABLE 9

| | C | H | N | Ash |
|---|---|---|---|---|
| Found (% wt.) | 43.6 | 4.7 | 24.4 | 2.1 |
| Calc. ash free | 44.6* | 4.8 | 24.9 | |
| Calc. for $C_{13}H_{16}N_6O_5$ | 46.4 | 4.8 | 25.0 | |

* Elemental analyses on other samples indicated the analyst was reporting somewhat erratic C values, which sometimes were as high as 45.4% (ash free). The material melts with decomposition at about 205°–7° C.

3. When the material is made by different methods and conditions the product always appears to be substantially the same. This would suggest a combination formed in the fashion of a copolymer until its molecular size renders it unsoluble. At this point it would precipitate and react no further. This can provide a material of very uniform size. (3 urea + 2 furfural −2 water = m.w. 336). Preliminary results confirm this molecular weight.

In the foregoing examples, the preparation and application of a urea reaction product using furfural is described. It is within the scope of the invention to use crude natural sources of furfural such as oat hulls, corn cobs, forages, or forest by-products. However these crude materials must be treated under acidic conditions to release free furfural before reaction.

We claim:

1. An animal feed containing up to 10 percent by weight as a non-protein nitrogen source, a granular reaction product of urea with furfural prepared in aqueous solution at an acid pH and containing about 21 to 26 percent by wt nitrogen, said product being slowly hydrolyzable in water.

2. The animal feed of claim 1 containing up to about 4 wt. percent of the reaction product.

3. The animal feed of claim 1 wherein the reaction product contains 24 to 26 percent wt. nitrogen.

4. The animal feed of claim 1 wherein the reaction product was prepared using a molar ratio of furfural to urea of about 0.5/1.

5. The animal feed of claim 1 wherein the reaction product was prepared using a stoichiometric excess of urea.

6. A method of preparing animal feed comprising incorporating in the rations as a non-protein nitrogen source, in an amount up to 10 percent by weight, a granular reaction product of urea and furfural prepared in aqueous solution at an acid pH and containing about 21 to 26 percent by weight nitrogen, said product being slowly hydrolyzable in water.

7. The method of claim 6 wherein the reaction product is incorporated in amounts up to about 4 percent by wt. of the total rations.

8. The method of claim 6 wherein the reaction produce is admixed with feed in amounts up to 40 percent by wt. of the mixture for subsequent dilution.

9. The method of claim 6 wherein the reaction product was prepared using a molar ratio of furfural to urea of about 0.5/1.

* * * * *